United States Patent
Eberhardt

(10) Patent No.: US 7,447,581 B2
(45) Date of Patent: Nov. 4, 2008

(54) PROCEDURE FOR CONTROLLING THE LIGHT WIDTH OF A MOTOR VEHICLE

(75) Inventor: Stefan Eberhardt, Backnang (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 11/508,149

(22) Filed: Aug. 23, 2006

(65) Prior Publication Data

US 2007/0047244 A1 Mar. 1, 2007

(30) Foreign Application Priority Data

Aug. 24, 2005 (DE) ........................ 10 2005 039 905
Apr. 4, 2006 (DE) ........................ 10 2006 016 073

(51) Int. Cl.
G05D 1/00 (2006.01)
G06F 7/00 (2006.01)
G06F 17/00 (2006.01)

(52) U.S. Cl. .............................. 701/49; 701/28; 701/36; 340/467; 340/461; 340/435; 340/903; 180/167; 348/42; 348/118; 348/135; 348/148

(58) Field of Classification Search .................. 701/49, 701/36, 28; 340/467, 461, 435, 903, 901; 180/167; 348/118, 135, 148, 42
See application file for complete search history.

(56) References Cited

U.S. PATENT DOCUMENTS

| | | | |
|---|---|---|---|
| 5,865,265 A * | 2/1999 | Matsumoto | 180/169 |
| 6,278,364 B1 * | 8/2001 | Robert | 340/467 |
| 6,373,378 B1 * | 4/2002 | Ewerhart et al. | 340/425.5 |
| 6,396,397 B1 * | 5/2002 | Bos et al. | 340/461 |
| 6,861,809 B2 * | 3/2005 | Stam | 315/82 |
| 7,301,478 B1 * | 11/2007 | Chinn et al. | 340/905 |
| 2003/0107323 A1 * | 6/2003 | Stam | 315/82 |
| 2003/0138131 A1 * | 7/2003 | Stam et al. | 382/104 |
| 2004/0143380 A1 * | 7/2004 | Stam et al. | 701/36 |
| 2004/0167697 A1 * | 8/2004 | Albou et al. | 701/49 |
| 2005/0122726 A1 * | 6/2005 | Yamamoto et al. | 362/464 |
| 2005/0162856 A1 * | 7/2005 | Ito et al. | 362/464 |
| 2006/0039158 A1 * | 2/2006 | Kurz et al. | 362/539 |
| 2006/0125919 A1 * | 6/2006 | Camilleri et al. | 348/148 |
| 2006/0206243 A1 * | 9/2006 | Pawlicki et al. | 701/1 |
| 2006/0208169 A1 * | 9/2006 | Breed et al. | 250/221 |

FOREIGN PATENT DOCUMENTS

| | | |
|---|---|---|
| DE | 199 02 015 A1 | 7/2000 |
| EP | 1 515 293 A1 | 3/2005 |

* cited by examiner

Primary Examiner—Khoi H. Tran
Assistant Examiner—Jorge O Peche
(74) Attorney, Agent, or Firm—Crowell & Moring LLP

(57) ABSTRACT

In a method for traffic dependent light width adjustment of light width for headlights in a motor vehicle, at least two image capturing units are provided whose pictures are forwarded to a control unit for evaluation. A control unit for controlling the light width of the headlights is provided, and on the basis of the captured pictures of both image capturing units a classification of the light sources outside of the vehicle is conducted. A distinction is made between oncoming, standing, and distancing light sources. With this classification the light width of the headlights is adjusted.

3 Claims, 5 Drawing Sheets

PROCEDURE FOR CONTROLLING THE LIGHT WIDTH OF A MOTOR VEHICLE

BACKGROUND AND SUMMARY OF THE INVENTION

This application claims the priority of German patent document 102005039905.3, filed Aug. 24, 2005, the disclosure of which is expressly incorporated by reference herein.

The invention is directed to an arrangement for adapting a lighting system to a motor vehicle.

Such a lighting system is disclosed, for example, in German patent document DE 199 020 15 A1, in which an image recording device and an image evaluation arrangement capture images that are used by an adjustment device to control the lighting system.

One object of the present invention is to provide an improved method of this generic type, which responds better to changes in traffic conditions, and controls the beam width of the headlights of the motor vehicle and/or the shape of the light beam, so that the driver has an optimal illumination of the area in front of his vehicle without blinding the oncoming traffic at the same time.

In contrast to the known state of the art, the method according to the invention for traffic dependent light width regulation uses images from at least two cameras, which work together as a stereo camera, and makes it possible to represent a spatial picture. In this manner, it is possible more advantageously to arrange the position of different light sources in the area outside of the motor vehicle and better to determine their separation from their own vehicle and from each other.

In addition, the information which is obtained by evaluating the camera images can be used not only to adjust the light width; it can also be evaluated to further assist functions in the vehicle. For example, by determining the path and/or the surface condition of the road, a speed warning can be generated. Moreover this information can also be evaluated by a control device to adapt the vehicle behavior to the actual conditions. Thus, the motor and/or drive control, chassis arrangement and driving dynamics adjustment, for example, can be adapted to irregularities and wetness of the highway.

The recognition of objects and the determination of the object position has the further advantage that, with the recognized object the road course can be better defined, and relative movement of the objects can be represented to one's own vehicle. This again makes it possible to activate various additional functions such as for example the active pedestrian protection, and automatic high beam or the passing lights.

In addition to object recognition, evaluation of the camera pictures also makes it possible, using the captured light, to draw conclusions regarding the light ratio and the visibility. Moreover the activation of the rain sensors, the front fog lights and the rear fog lights can be used.

The evaluation of the pictures from at least two cameras has the further advantage that the pictures taken can be evaluated for plausibility and that the failure of one camera need not lead to a general shutdown of light width regulation. Rather, an emergency control mode can be activated.

By the additional features, advantageous further advances and arrangements of the traffic dependent light width regulation are apparent from the invention. Thus, the capture of various conditions around and in the vehicle has the advantage that the various factors to which the light width of the headlights is to be adapted can be divided into various priority stages, and the procedures whereby each of the various figures is to be evaluated can be utilized according to the requirements of an order of importance priority list.

A further advantage of the invention is that by the continuous picture capture, the headlight control is always adaptable to the actual present conditions.

DETAILED DESCRIPTION OF THE DRAWINGS

Figure 1:
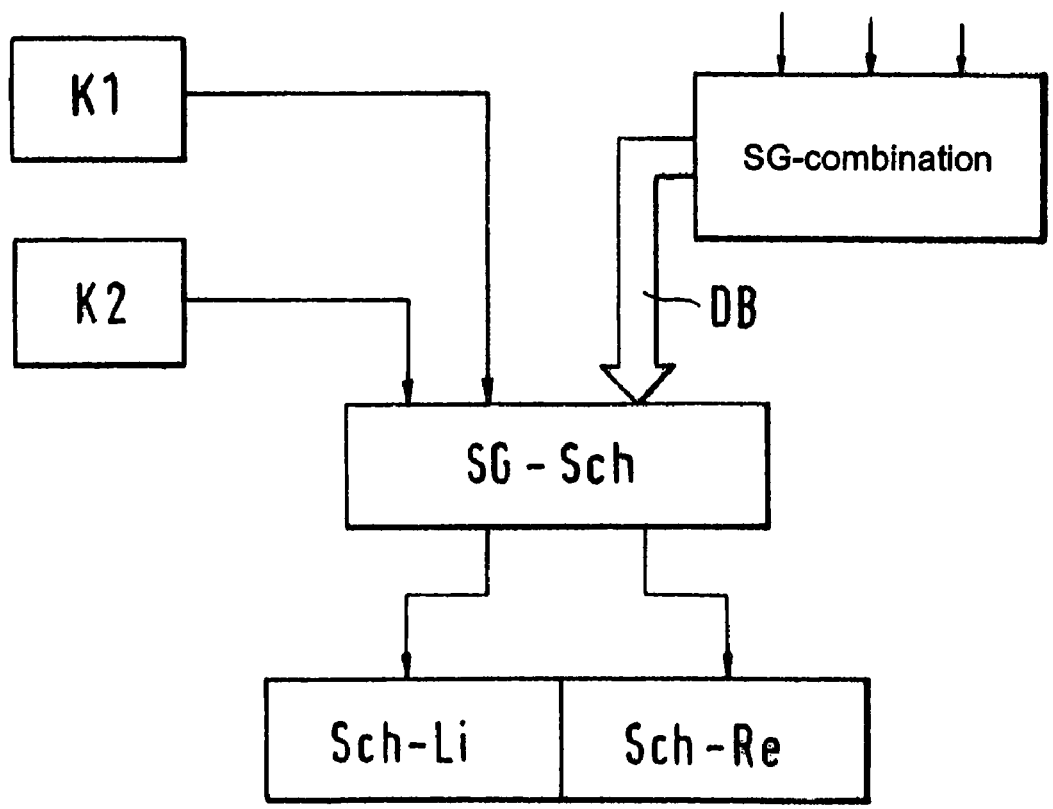
FIG. 1 is a schematic diagram of an arrangement for implementing the procedure according to the invention.

FIG. 1 shows one possible design of an arrangement for implementing the procedure according to the invention. Images acquired by two cameras K1 and K2 input to a headlight control device SG-Sch, which also receives data captured and evaluated by other control devices (such as, for example, the speed of the vehicle). The additional control devices are represented by a control device connection SG-Ver which exchanges data for example over a data bus DB. The headlight control device evaluates the received data and images, and controls the light width of the headlights. The right headlight Sch-Re can be controlled independently from the left headlight Sch-Li, or alternatively both headlights can be adjusted together in their light width.

Figure 2:
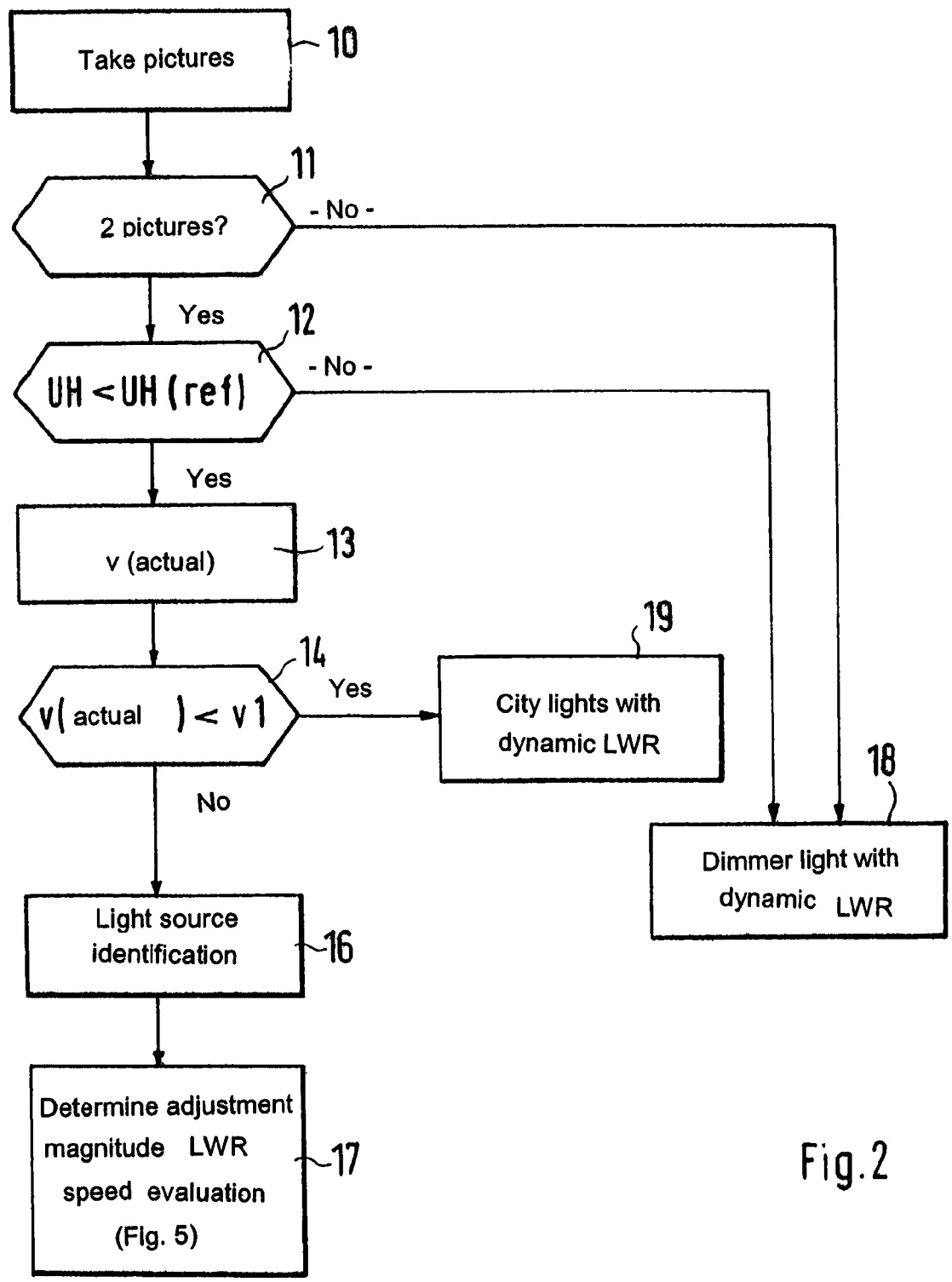
FIG. 2 is the program flow chart which depicts the method according to the invention, for traffic dependent light width regulation.

In the procedure according to the invention as shown in to FIG. 2 the pictures from at least two cameras are captured in a first step 10, and in a step 11 it is determined whether both cameras are delivering pictures. If both cameras store a picture, the "yes" output of the interrogation in step 11 leads to step 12 in which the environment brightness of the vehicle is captured and compared with a pre-assigned reference value. This pre-assignable reference value is selected such that, for environmental brightness that exceeds the reference value, the field of vision as a result of natural or public lighting is sufficient, and traffic dependent light width regulation of the headlights is not needed. Thus, if the answer in step 12 is "no" (that is, the level of environmental illumination is greater than the reference value) then the dimmer light in step 18 is activated with dynamic light width regulation. The dynamic light width regulation captures and processes merely the information present in the vehicle such as speed, load condition, and dipping of the vehicle in order to adapt the light width of the headlights.

If, however, the environmental brightness in step 12 is less than the pre-assignable reference value ("yes"), in step 13 the actual speed $v_{(actual)}$ of the vehicle is captured. (This value is already known in the vehicle, and needs only be made available to the traffic dependent light width regulation, for example via a data bus. The actual speed $v_{(actual)}$ is subsequently compared with a first reference value v1, a relatively small speed, such as 40 kilometers per hour which is recommended in the application. The first speed threshold v1 was established in order to reduce the headlight range when the blinding of other traffic participants should be minimized. If the actual speed is less than the first reference value ($V_{(actual)}$ <v1), in step 19 the range of the headlights is reduced to a city lighting mode, which can be enhanced by the dynamic light width regulation, If the actual speed is greater than the first reference value v1, the comparison stage 14 is answered with "no". Thus, the conditions are met for traffic dependent light width regulation VLWR, and in step 16 a light source identification is performed, in a manner that is shown in detail in FIG. 3, and is further explained below.

Figure 4:
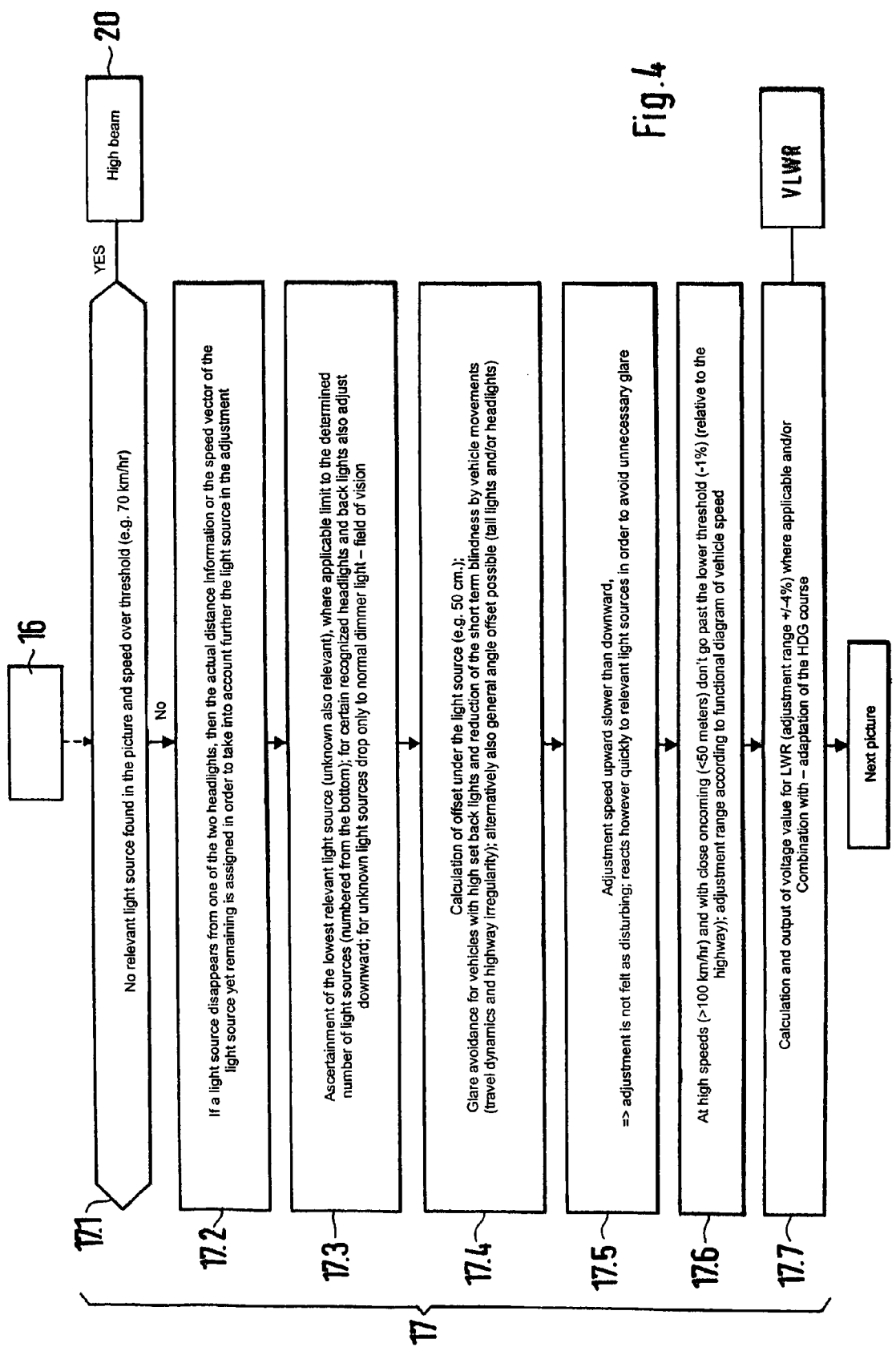
FIG. 4 illustrates a detail 17 of the adjustment magnitude determination and light width regulation in the program flow chart in FIG. 2.

After the determination and identification of the light source in step 16, a light width adjustment determination is performed in step 17, as shown separately in FIG. 4.

Figure 3:
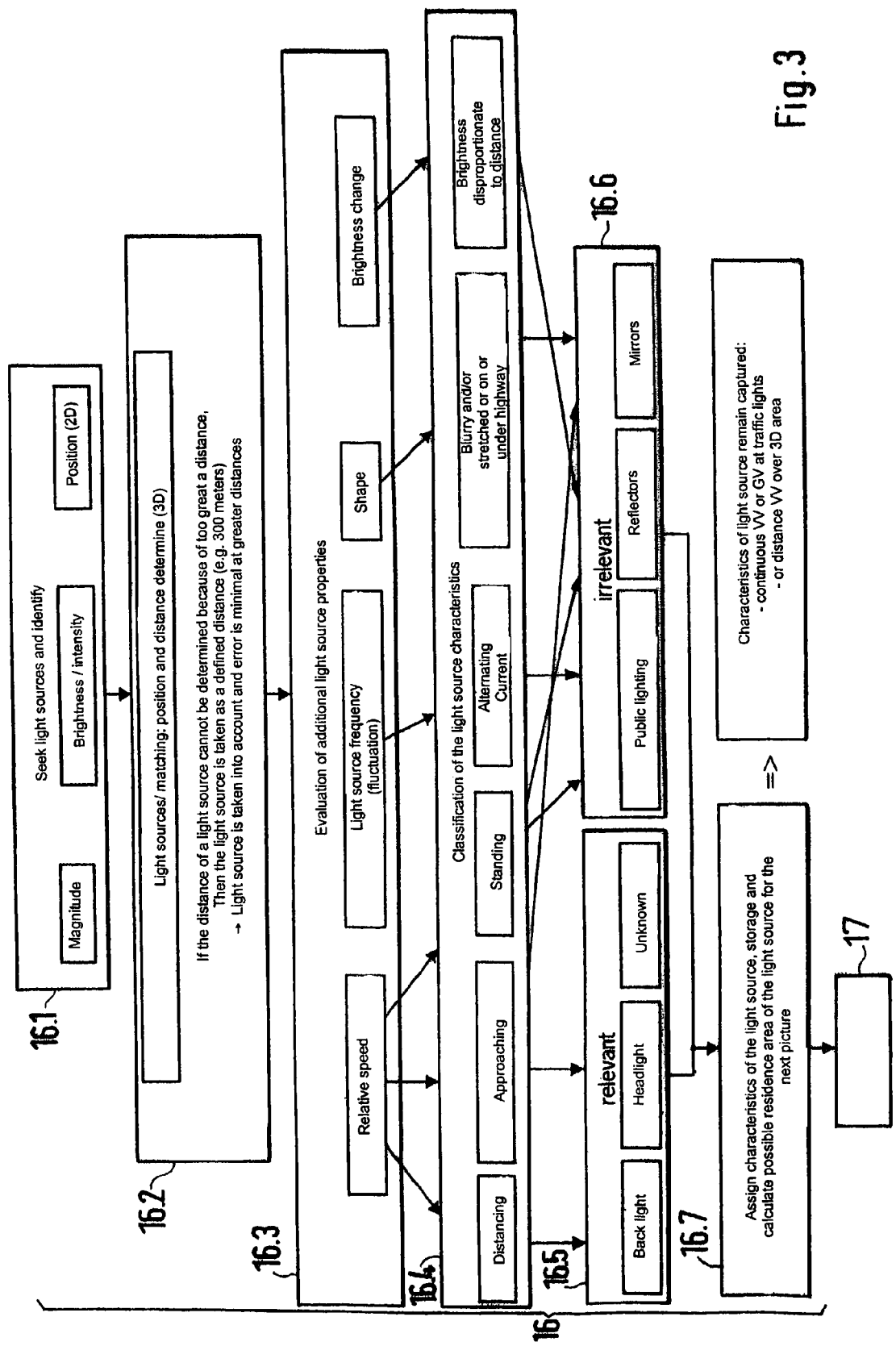
FIG. 3 illustrates a detail 16 of the light source identification in the program flow chart of FIG. 2.

The evaluation, calibration, and classification of a captured light source for traffic dependent light width regulation (represented schematically in FIG. 2) is performed in step 16, as shown in detail in FIG. 3. In step 16.1, the light source is first sought, and its size and brightness are determined. With this information from both cameras, in step 16.2 a three dimensional picture is generated and a position and distance determination are performed. If the light source cannot be determined because the distance is too great, the light source is assigned a defined distance so that it is taken into account, but in each case for further evaluation.

By the evaluation of the pictures from at least two cameras, in the pertinent control device determined conditions and possible case examples are consigned so that in the generation of the spatial picture and the evaluation of the captured objects, no erroneous interpretation is involved.

After the identifying and determining the position of the light source, its properties are evaluated, such as for example its speed relative to the highway, the light frequency, the form of the light source and any brightness or brightness change, as shown in step 16.3.

The evaluation of the light source properties in step 16.3 facilitates a classification of the captured light source and the differentiation in step 16.4, according to the following considerations:

a receding light source,
an oncoming light source,
a standing light source,
a light source which is operated with alternating current, and
whether the contours of the light source are blurry, or
in what relation the brightness stands to distance.

With this information a characterization of the external light source is undertaken. The following summary gives possible conclusions and their distribution to the evaluated light sources—properties in step 16.4.

receding light source→back light
approaching light source→headlights or reflectors
standing light source→public lighting or standing vehicle
light with alternating current→public lighting; and
blurry outline→reflectors.

This characterization and determination of the light sources allows their assignment into relevant, 16.5, and irrelevant light sources, 16.6, as shown in FIG. 3.

Lastly after the evaluation light source identification in step 16.7, the characteristics of the captured light source as well as the place are stored and compared with a light source determined in the next captured picture. This makes it possible to consider changes of the position of a captured light source and short-term disappearing light sources, for example, if the vehicle, which was identified by reason of a captured light source, remains, then the characteristics of the light source are assigned and it is not closed but rather recognized as a vehicle traveling in front, VV, or approaching traffic, GV.

After the light source identification in FIG. 3, as represented in the program flow chart of FIG. 2, with the step 17 an adjustment magnitude is determined for light width regulation, as shown separately in FIG. 4.

First of all in step 17.1 it is checked whether, if applicable, no relevant light source was ascertained and the speed of the vehicle lies over a predetermined threshold. If so, the high beam 20 is switched on.

If, however, one of these conditions is not met, in step 17.2 it is determined whether a light source disappears from one of the two camera pictures. If so, then the last available distance information or the speed vector of the yet remaining light source is assigned in order to consider the light source further in performing the regulation.

In step 17.3 the lowest relevant light source is determined, and the light width is lowered corresponding to the height of such light source. Here it is to be considered that no adjustment is performed under the present dimming light range when the light source is recognized certainly as a back light or a headlight.

In adapting the brightness limit of the headlight to a captured back light in the step 17.4 it is meaningful to lower the light beam of the headlight by a defined distance in relation to the captured light source, whereby the defined distance is also established as an offset angle. Thus it is avoided that the driver of a vehicle traveling in front (front traffic VV) which has a high set back light, or an oncoming vehicle (oncoming traffic GV) is blinded. Likewise the risk of a short term blinding effect due to highway unevenness is minimized.

In step 17.5 an adjustment magnitude is determined for light width regulation, so that the adjustment speed in raising the light beam can be slower than in lowering the light beam. Thus, the adjustment of the light beam as a rule is felt as harmonically pleasant, but at the same time the blinding effect is countered more quickly.

Afterwards in step 17.6 a minimum lower boundary is established for the light beam when the speed of the vehicle exceeds a preset high speed value and oncoming traffic is recognized at short distance.

Figure 5:
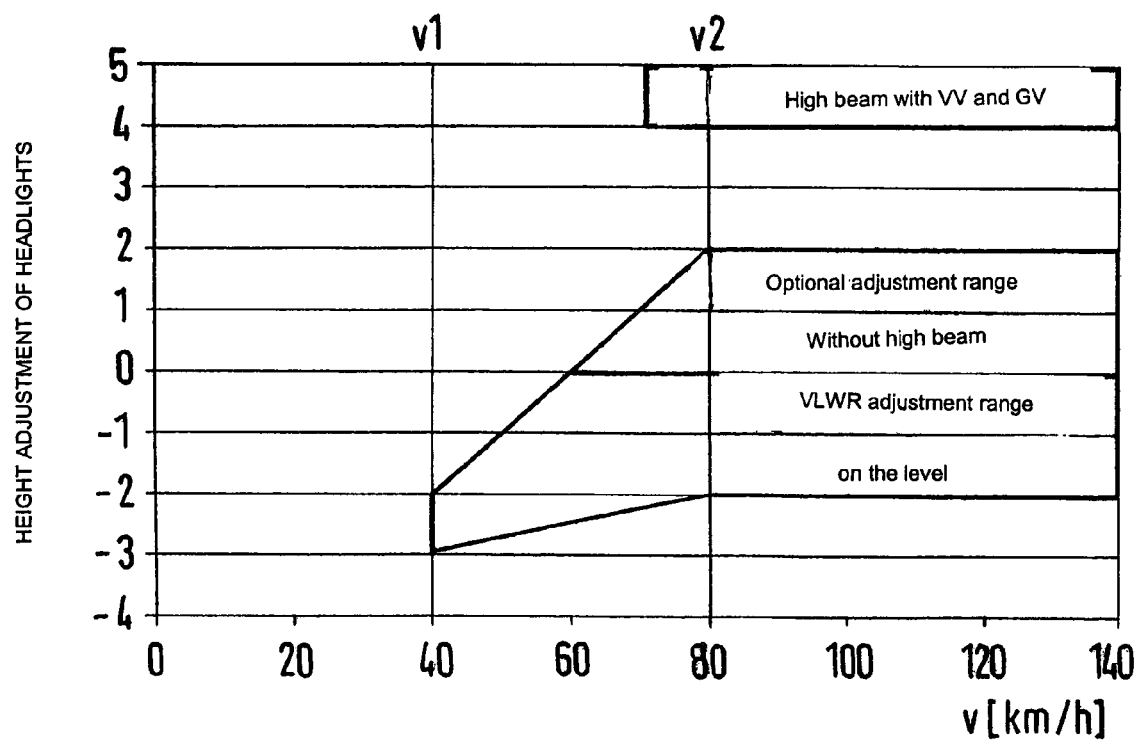
FIG. 5 shows light width as a function of speed.

The dependence of the calculation on speed in important, and is represented separately in FIG. 5. After the case differentiation and determination of various parameters from the foregoing steps, in step 17.7 a value for the adjustment of the headlight is calculated and output to the adjustment unit for adjusting the traffic dependent light width regulation (VLWR).

FIG. 5 shows the height setting of the headlight as a function of the vehicle velocity, with a first preset reference speed v1 being set to 40 km/hr and a second presettable reference speed v2 at 80 km/hr. As can be inferred from FIG. 5, the light width regulation commences when the vehicle reaches the first presettable reference value v1. Above this first reference value there is a first area in which the adjustment range of the traffic dependent light width adjustment on the level and is located therewith essentially directly below the rest position or null position. Thereabove, a regulation range is added which is assigned without high beam switching of the light range of the dimmer light optimally to the acquired light source, and therewith to the recognized object.

At high speeds, for which lighting by the traffic dependent light width adjustment of the dimming light is not adequate, the high beam light is switched on.

In the speed range between the first and the second presettable reference value the light width is for all cases at first smaller and increases with rising speed, while the light width above the speed v2 has a constant magnitude according to the adjustment range.

Finally it is further mentioned that the data and picture from the cameras which are adjustable, as well by daylight as also in darkness, can be used for further very different applications.

There is to be considered the use for distance control, for pre-save and pre-crash functions, the recognition of traffic signs or the control of climate control.

The driving comfort and safety relevant systems are better usable with the pictures from the cameras.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed:

1. A method for traffic dependent light width adjustment for motor vehicle headlights having a high beam and a dimmer light, said method comprising:

providing at least two image capturing units;

forwarding images from the image capturing units to a control unit for evaluation;

said control unit controlling at least one of light width and shape of the lighting of the dimmer light of said headlights;

based on captured images from said at least two image capturing units, classifying light sources outside of the vehicle; and based on said classification implementing a traffic dependent adjustment of at least one of light width and shape of lighting of the dimmer light of said headlights; and controlling the dimmer light of the headlights accordingly;

wherein traffic dependent light width adjustment is conducted only if i) images are present in each of said at least two image capturing units, ii) environmental lighting is below a presettable environmental lighting and iii) vehicle speed is above a presettable value, wherein the traffic dependent light width adjustment includes a light source identification, and further wherein after the light source identification an adjustment magnitude is determined for the light width adjustment; and wherein when the condition of the images are present in each of said at least two image capturing units is not met the dimmer light is activated with dynamic light width regulation, when the condition of the environmental lighting is below a presettable environmental lighting is not met the dimmer light is activated with dynamic light width regulation, and when the condition of vehicle speed is above a presettable value is not met the range of the headlights is reduced to a city lighting mode with dynamic light width regulation, which take into account only parameters other than the classification of light sources outside the vehicle, which parameters are otherwise available in the vehicle.

2. The method according to claim 1, wherein:

a captured light source is differentiated as between public lighting, reflectors, mirrors, unknown lighting, headlights, and back lights; and headlights, back lights, and unknown light sources are considered relevant for traffic dependent light width adjustment.

3. The method according to claim 2, wherein according to the recognition of several light sources, the headlights are adjusted to a lowest permissible light source.

* * * * *